United States Patent
Hort et al.

(10) Patent No.: US 11,374,809 B2
(45) Date of Patent: Jun. 28, 2022

(54) AUXILIARY DEVICE TO ENHANCE NATIVE IN-VEHICLE SYSTEMS BY ADDING INTERFACES AND COMPUTATIONAL POWER

(71) Applicant: HARMAN BECKER AUTOMOTIVE SYSTEMS GMBH, Karlsbad (DE)

(72) Inventors: Christian Hort, Karlsruhe (DE);
Andreas Huber, Karlsruhe (DE);
Herbert Vogt, Haigerloch (DE);
Vishnu Sundaram, Banglore (DE);
David Slump, Weston, CT (US);
Stephen L. Surhigh, Bloomfield Village, MI (US)

(73) Assignee: HARMAN BECKER AUTOMOTIVE SYSTEMS GMBH, Karlsbad (DE)

(*) Notice: Subject to any disclaimer, the term of this patent is extended or adjusted under 35 U.S.C. 154(b) by 145 days.

(21) Appl. No.: 15/058,031

(22) Filed: Mar. 1, 2016

(65) Prior Publication Data

US 2016/0197783 A1    Jul. 7, 2016

Related U.S. Application Data

(63) Continuation-in-part of application No. 14/633,007, filed on Feb. 26, 2015.

(30) Foreign Application Priority Data

Jan. 1, 2015   (IN) .......................... IN03/CHE/2015

(51) Int. Cl.
*H04L 41/0806*   (2022.01)
*H04L 41/08*   (2022.01)
(Continued)

(52) U.S. Cl.
CPC ...... *H04L 41/0809* (2013.01); *H04L 41/0889* (2013.01); *H04L 67/2823* (2013.01);
(Continued)

(58) Field of Classification Search
CPC ......... H04L 67/12; H04L 63/10; H04L 63/08; H04L 67/02; H04L 67/2823;
(Continued)

(56) References Cited

U.S. PATENT DOCUMENTS 7,363,129 B1 *   4/2008   Barnicle ................ G08C 17/02
                                          701/1
8,769,638 B2 *   7/2014   Seo ................... H04N 21/43615
                                          709/224

(Continued)

FOREIGN PATENT DOCUMENTS

| EP | 1361713 A1 | 11/2003 |
| EP | 1396962 A1 | 3/2004 |
| WO | 2008043059 A1 | 4/2008 |

OTHER PUBLICATIONS

U.S. Non-Final Office Action having U.S. Appl. No. 14/633,007, dated Nov. 23, 2016, 16 pages.

(Continued)

*Primary Examiner* — Kevin T Bates
*Assistant Examiner* — Ranjan Pant
(74) *Attorney, Agent, or Firm* — Artegis Law Group, LLP

(57) ABSTRACT

The present invention provides a removable device, adapted to connect to a head unit of a vehicle and comprising: a first communication module configured for bi-directional communication of data with the head unit; a second communication module configured for bi-directional communication of data with a wireless network, in particular a mobile telecommunication network; a memory unit storing an application programming interface (API) implementing at least a (Continued)

first protocol for the communication with the head unit via the first communication module; and a control unit comprising at least one processing unit adapted to execute the API; wherein the control unit is configured to provide at least one service to the head unit via the first communication module.

16 Claims, 5 Drawing Sheets

(51) Int. Cl.
*H04W 4/40* (2018.01)
*H04L 67/565* (2022.01)
*H04L 69/18* (2022.01)
*H04L 69/08* (2022.01)
*G06F 9/4401* (2018.01)
*H04W 4/80* (2018.01)

(52) U.S. Cl.
CPC .............. *H04L 69/08* (2013.01); *H04L 69/18* (2013.01); *H04W 4/40* (2018.02); *G06F 9/4411* (2013.01); *H04W 4/80* (2018.02)

(58) Field of Classification Search
CPC ......... H04L 2012/2841; H04L 41/0809; H04L 63/0853; H04L 12/2818; H04L 2209/84; H04L 67/303; H04L 67/306; H04L 69/08; H04L 69/18; H04L 41/0889; H04W 4/008; H04W 84/12; H04W 4/005; H04W 4/046; H04W 52/0261; H04W 72/1215; H04W 4/80; H04W 4/40; G06F 9/4411
See application file for complete search history.

(56) References Cited

U.S. PATENT DOCUMENTS

| | | | |
|---|---|---|---|
| 8,868,679 B2 * | 10/2014 | Bell ...................... | H04W 76/00 709/217 |
| 2003/0110253 A1 * | 6/2003 | Anuszczyk ............... | G06F 8/70 709/224 |
| 2005/0245272 A1 * | 11/2005 | Spaur .................. | H04L 12/4625 455/456.3 |
| 2005/0266879 A1 * | 12/2005 | Spaur .................. | H04L 12/4625 455/556.2 |
| 2008/0261643 A1 | 10/2008 | Bauer | |
| 2008/0278343 A1 | 11/2008 | Bauer | |
| 2009/0240427 A1 * | 9/2009 | Siereveld ................ | H04L 67/18 345/173 |
| 2011/0106333 A1 * | 5/2011 | Scheider ................. | H04L 12/66 701/1 |
| 2012/0198080 A1 | 8/2012 | Yang et al. | |
| 2013/0053003 A1 * | 2/2013 | King, II .................. | H04W 4/00 455/414.1 |
| 2013/0157647 A1 | 6/2013 | Kolodziej | |
| 2013/0167159 A1 * | 6/2013 | Ricci ....................... | H04W 4/90 719/319 |
| 2013/0211628 A1 | 8/2013 | Thurow et al. | |
| 2013/0238165 A1 | 9/2013 | Garrett et al. | |
| 2014/0037092 A1 * | 2/2014 | Bhattacharya ........ | H04L 9/0891 380/259 |
| 2014/0068713 A1 * | 3/2014 | Nicholson ............. | H04W 12/06 726/3 |
| 2014/0096217 A1 | 4/2014 | Lehmann | |
| 2014/0109080 A1 * | 4/2014 | Ricci ......................... | G06F 8/61 717/174 |
| 2014/0118222 A1 * | 5/2014 | Barrett ................ | H04M 1/7253 345/2.2 |
| 2014/0121891 A1 * | 5/2014 | Barrett ..................... | H04L 69/08 701/33.2 |
| 2014/0129047 A1 * | 5/2014 | Barrett ..................... | G07C 5/00 701/1 |
| 2014/0187149 A1 * | 7/2014 | Lortz ...................... | H04L 67/16 455/41.1 |
| 2014/0256304 A1 * | 9/2014 | Frye ........................ | H04W 4/21 455/418 |
| 2014/0277937 A1 | 9/2014 | Scholz et al. | |
| 2015/0007619 A1 * | 1/2015 | Finney .................... | G07F 17/10 70/58 |
| 2015/0026312 A1 * | 1/2015 | Othmer ................. | H04W 48/18 709/220 |
| 2015/0089092 A1 | 3/2015 | Voto et al. | |
| 2015/0100633 A1 * | 4/2015 | Barrett ..................... | B62J 99/00 709/204 |
| 2015/0245198 A1 * | 8/2015 | Fliege ..................... | H04W 8/22 455/420 |
| 2015/0281409 A1 * | 10/2015 | Tatiya .................... | G06F 13/385 709/217 |
| 2016/0126995 A1 | 5/2016 | Li | |
| 2016/0247125 A1 * | 8/2016 | Theisen ............. | G06Q 10/1095 |
| 2017/0195324 A1 * | 7/2017 | Yamamoto ............ | H04W 76/15 |
| 2019/0068718 A1 * | 2/2019 | Lee ........................ | H04L 67/141 |
| 2020/0120500 A1 * | 4/2020 | Sharma ............. | H04W 12/0401 |

OTHER PUBLICATIONS

Extended European Search Report for Application No. 15202277.8, dated Mar. 16, 2014, 13 pages.

International Search Report for Application No. PCT/EP2015/080809, dated Mar. 8, 2016, 14 pages.

Final Office Action for U.S. Appl. No. 14/633,007, dated Jun. 13, 2017.

Non-Final Office Action for U.S. Appl. No. 14/633,007, dated Nov. 22, 2017.

* cited by examiner

AUXILIARY DEVICE TO ENHANCE NATIVE IN-VEHICLE SYSTEMS BY ADDING INTERFACES AND COMPUTATIONAL POWER

CROSS-REFERENCE TO RELATED APPLICATIONS

This application is a continuation-in-part of the co-pending U.S. patent application titled, "METHOD AND APPARATUS FOR CONNECTING A MOBILE COMMUNICATION DEVICE TO A HEAD UNIT OF A VEHICLE," filed on Feb. 26, 2015 and having Ser. No. 14/633,007, which claims priority to Indian patent application titled, "METHOD AND APPARATUS FOR CONNECTING A MOBILE COMMUNICATION DEVICE TO A HEAD UNIT OF A VEHICLE," filed on Jan. 1, 2015, having Application No. 3/CHE/2015. The subject matter of these related applications are hereby incorporated herein by reference.

FIELD OF INVENTION

The present invention relates to an auxiliary device to enhance native in-vehicle systems by adding interfaces and computational power.

BACKGROUND OF THE INVENTION

In the recent past, the pace at which new developments are released in the field of consumer electronics (CE), in particular with respect to the development of mobile communication devices such as smart phones, has been continuously accelerated whereas automotive development cycles have essentially remained the same. As a consequence, an increasing gap between features and applications provided by CE devices and the corresponding automotive environment, in particular the head units of released vehicles, has formed, resulting in unsatisfactory use of CE devices in combination with infotainment systems of automobiles.

While head units may be upgraded to accommodate new features of CE devices, such upgrades usually involve costly replacements of at least part of the head unit. The end customer pricing therefore often ranges from 300 USD to 3,000 USD including installation. Recently, efforts have started to make data stored on smart phones and their functionality available to head units of vehicles. Apple's CarPlay, for instance provides direct access to iOS device functionality, control, and usage, as a virtual machine on top of the automotive manufacturers' native in-car control systems. Similarly, Android Auto Link (AAL) is designed to project or mirror the operating system of smart phones using Android on the in-vehicle infotainment (IVI) system. In both cases, users can access some functions, like maps, messages, music or telephony, of the smart phone via the in-vehicle infotainment system and its main display. Both options, however, require the IVI system, and in particular the head unit, to be compatible with the protocols used to exchange data between the head unit and the smart phone. Therefore, existing head units in the market often cannot make use of the functionality provided by the above systems. In addition, car manufacturers need to accommodate both approaches separately due to the lack of a standard protocol.

The present application aims at bridging the gap between the fast moving CE development cycles and the considerably slower automotive development cycles. An inexpensive device is provided to make full use of the existing car infrastructure and to be installed by the end customer in a very convenient way (Plug&Play) at a much lower price than traditional head unit upgrades. A further object of the present application is the provision of a single device to accommodate different requirements of various manufacturers of CE devices.

BRIEF DESCRIPTION OF THE DRAWINGS

Further features and exemplary embodiments as well as advantages of the present invention will be explained in detail with respect to the drawings. It is understood that the present invention should not be construed as being limited by the description of the following embodiments. It should furthermore be understood that some or all of the features described in the following may also be combined in alternative ways.

Figure 1:
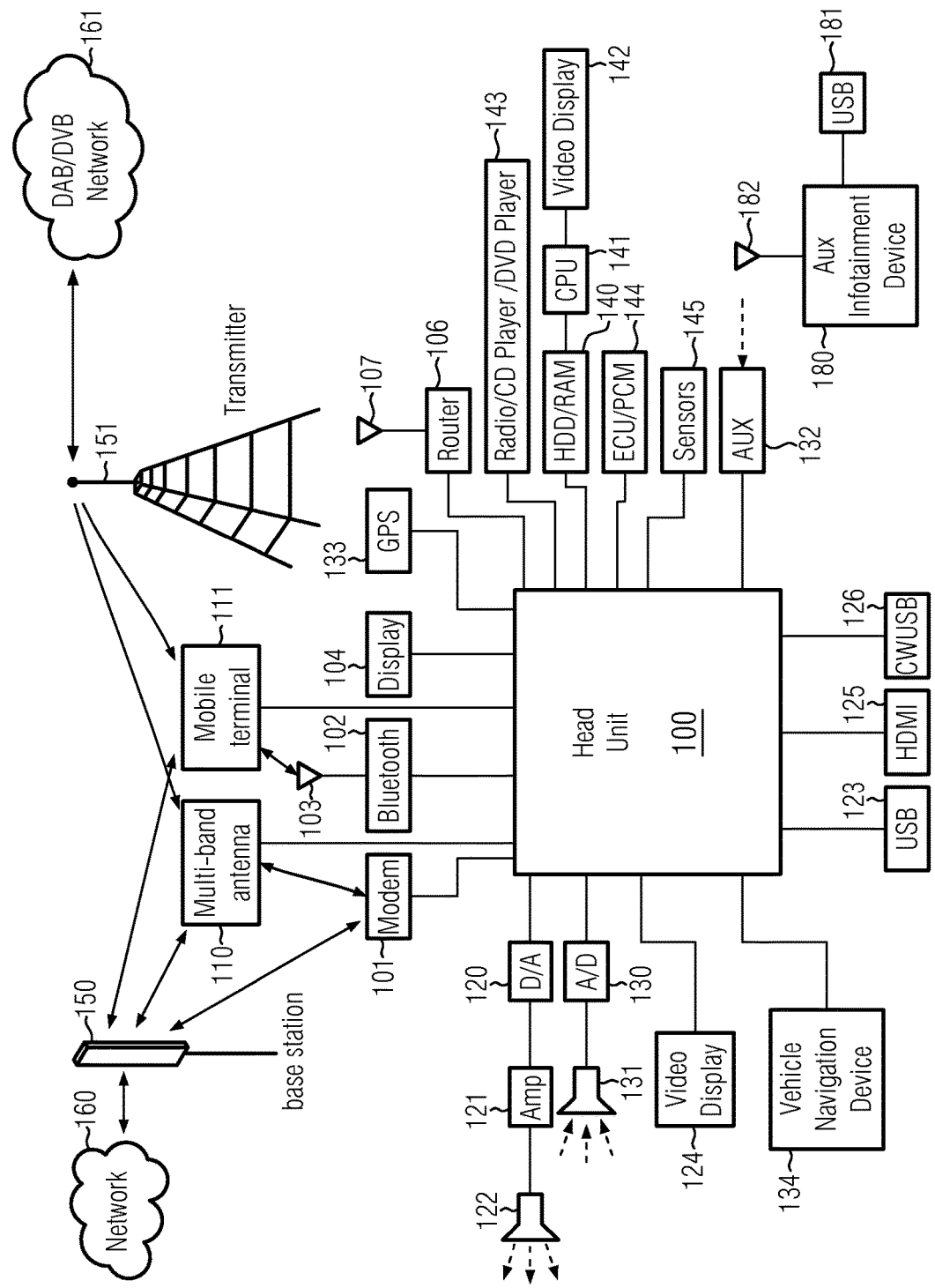
FIG. 1 shows an exemplary embodiment of an in-vehicle infotainment system comprising a head unit.

In the figures, identical reference signs indicate identical or similar components.

DESCRIPTION OF THE INVENTION

The technical problems described above are solved by a removable device, which is adapted to connect a mobile communication device to a head unit of a vehicle and comprises: a first communication module having a first transceiver and being configured for bi-directional communication of data with the head unit; a second communication module having a second transceiver and being configured for bi-directional communication of data with the mobile communication device; and a control unit configured to provide at least one service to the head unit via the first communication module based on data received via the second communication module.

The first and second communication modules and their respective transceivers are separate modules with separate transceivers. All communication modules referred to in this document are equipped with the necessary components for transmission and reception of data via their corresponding transceivers. As these components, e. g. encoders/decoders, modulators/demodulators, data mappers, analog-to-digital/digital-to-analog converters, etc., are well known in the art, they are not described in detail here. The particular components required for transmission/reception of data to/from a device, like the head unit or the mobile communication device, depend on the method of the transmission, e. g. wireless transmission using Wi-Fi, Bluetooth or mobile telecommunication networks, wired transmission via USB, HDMI or other connectors, etc., and can readily be provided together with the corresponding transceivers and potentially needed antennas as part of the respective communication module.

According to the present disclosure, the removable device comprises at least two communication modules with individual transceivers for bi-directional communication of data with the head unit and the mobile communication device, respectively. These communication modules may in particular use different transmission techniques. By way of example, the first communication module may communicate with the head unit via a standardized connector like USB or HDMI while the second communication module may communicate wirelessly with the mobile communication device via Bluetooth, Wi-Fi or certified wireless USB (CWUSB). The first communication module may also communicate wirelessly with the head unit, e. g. by using CWUSB, Wi-Fi or Bluetooth. Equally, the second communication module may communicate with the mobile communication device via a USB or HDMI connector. Many other combinations can be thought of and are included in the present disclosure as long as the removable device comprises at least a first and a second communication module for separate communications with the head unit and the mobile communication device. By providing separate communication modules, the removable device is in particular enabled to carry out simultaneous communications with both the head unit and the mobile communication device.

The present disclosure relates to a removable device, i. e. a portable device, which can be easily installed and removed by a user of the vehicle, e. g. by plugging the device into a port, like a USB or HDMI port, of the in-vehicle infotainment system or by placing the removable device inside the vehicle. The vehicle may in particular be a car or motorbike, but also a truck, a train, a ship/boat or an airplane, as long as the vehicle comprises a head unit. The removable device may assume form factors of various kinds. By way of example, the removable device may be supplied in the form of a stick, a dongle, a key fob or an adapter. It may be built in various sizes and designs and even be integrated into an electronic key of the vehicle. Size and weight of the removable device may be as small as to easily fit the device into a pocket, purse, bag or the like such that the device can be part of the set of personal CE devices of a person and be carried together with a smart phone or the like. As such, passengers of a vehicle may bring their own removable device to connect their mobile communication devices to the head unit of the vehicle. The embodiment of the removable device may in particular be general enough to allow for the use of a particular removable device with a plurality of vehicles by different manufacturers. Alternatively, the removable device may be part of the accessories package of a particular vehicle or a particular manufacturer.

The mobile communication device may be any kind of mobile terminal, like a mobile phone, smart phone, PDA, tablet computer, notebook or similar. A head unit according to the present disclosure is or at least comprises the center piece of the in-vehicle infotainment (IVI) system and may comprise or have access to further IVI components or vehicle components.

The in-vehicle infotainment system comprises at least one automotive telematics/infotainment component, but may comprise an arbitrary number of automotive telematics/infotainment components with an arbitrary level of interconnectivity. Herein, automotive telematics/infotainment components typically are hardware components installed in a vehicle but may also comprise software application components implemented in a single or multiple processing units. Typical automotive telematics/infotainment components may be chosen from, but are not limited to, the group comprising a car radio, a car sound system, including one or more speakers, amplifiers, and D/A converters, a microphone system, including one or more microphones and A/D converters, a vehicle navigation device, a GPS (Global Positioning System) device, one or several auxiliary input devices, like a touch screen, a mouse, a control stick, a trackball, or the like, one or several displays, one or several sensors, like pressure sensors, road condition sensors, parking sensors, light sensors, and the like, any electronic control unit (ECU) implementing the previously mentioned or other functionalities, a powertrain control module (PCM), one or several storage media, like a hard disk drive (HDD), an optical storage device, a RAM memory, and the like, a CD and/or DVD player, a wireless router, a Wi-Fi transceiver, one or more USB connectors, a Bluetooth transceiver with a Bluetooth antenna, one or more auxiliary devices with a USB connector and/or a Bluetooth transceiver, a modem (e.g. GSM, GPRS, UMTS, etc.), a wireless connectivity modem, a multi-band antenna, a satellite antenna, or similar. Specific inter-component interconnections like the automotive networks CAN, MOST, etc. or general interconnection technologies like Ethernet or USB may also play an important role at realization of specific telematics/infotainment functionalities within the vehicle.

The head unit as the center piece of the IVI system controls the components of the IVI system, receives data from at least some components and transmits data to some (other) components to provide a plurality of telematics/infotainment services to the user of the vehicle. Data received from or sent to some components may in particular include control signals. By way of example, control signals received from a touch screen, joystick, trackball or other input devices of the vehicle may be received by the head unit and provided to corresponding telematics/infotainment components. In combination with the other components of the IVI system, the head unit of a vehicle provides a plurality of telematics or infotainment services to the user of the vehicle, i. e. the driver or a passenger.

Here and in the following, a telematics/infotainment service denotes a service that is provided to a user, directly or indirectly, by one or several telematics/infotainment components of an in-vehicle infotainment system. Directly providing a telematics/infotainment service to a user may for instance comprise the provision and/or presentation of information and/or data to the user, e.g., in the form of navigation information, visually displaying information and/or data, like for instance videos, or reproduction of acoustic data like audio broadcasts or on-board telephony. It may further comprise receiving input from the user, e.g., in the form of voiced commands, on-board telephony, key inputs, for instance for vehicle navigation or games, or any kind of human machine interaction known in the art. Indirectly providing a telematics/infotainment service to a user may for instance comprise the provision of data to specific telematics/infotainment components like the controllers for seat and mirror positions or the on-board or off-board diagnostics of predetermined telematics/infotainment components. The latter may also involve the connection to and exchange of data with a remote server of a car retailer or mechanics.

Providing a telematics/infotainment service to a user may, in particular, involve an external, i.e. off-board provider of the specific service. Examples are displaying video streams, downloading videos, reproducing satellite radio broadcasts, accessing the World Wide Web, or any other data provision which requires access to an external (data) provider. In this case, the IVI system may provide a controller for accessing a remote server of the external provider, a processing unit for processing data received from the external provider and telematics/infotainment components, like displays, speakers, or similar, to provide the telematics/infotainment service to the user. It shall be understood that a telematics/infotainment service here and in the following is not limited to those services which can be provided to a user by the IVI alone, but also comprises those services which are provided in combination with external infrastructure like mobile telecommunication networks, digital video (DVB) and digital audio (DAB) broadcast networks, the internet, or the like. A telematics/infotainment service in particular comprises those services which are provided in combination with the removable device (see below).

An automotive telematics/infotainment component generally provides one or several specific (telematics/infotainment) services to the user and/or another component of the IVI system. The service may particularly be provided to the user and/or the other component through at least one application component of the IVI system. The application component may be provided by electronic circuitry but is generally implemented as a software application component in a processing unit. In particular, the application component may be a real-time application component, in a sense that execution of the application component by the processing unit happens in synchronization with a time scale predefined by other components of the vehicle. As an example, updating the display of a navigation system usually happens in synchronization with the movement of the vehicle and detected changes of the vehicle's GPS position. The processing unit may be any kind of electronic processing device, particularly a CPU or GPU as used in embedded systems, and the implementation may be in the form of a set of computer-executable instructions or program code or part of an application programming interface (API). The instruction set or program code for implementing and/or running the application component on the processing unit may be stored in a volatile or non-volatile memory and/or storage device as known in the art and may be configured when installed in the IVI system, customized by a user, and/or updated via external input to the IVI system. The processing unit and/or the memory and/or storage device may be part of a central telematics control unit (TCU) such as the head unit or may be part of an automotive telematics/infotainment component. Examples for such telematics/infotainment components are given in the detailed description of the invention further below.

Telematics/infotainment services of telematics/infotainment components provided by an application component comprise but are not limited to services from the group of infotainment, such as hands-free telephony, navigation, audio services, like AM/FM radio, Digital Audio Broadcast (DAB) radio, In-Band On-Channel (IBOC) digital radio, and satellite radio, video services, like DVD playback, HDD playback, Digital Video Broadcast (DVB) video services, 3GPP mobile video services, and the like, web access, email service, traffic information services, and Human-Machine-Interaction (HMI) services like on-board games and browsable vehicle information services or any other app-like services requiring vehicle-to-infrastructure communication. The service may be provided by a single application component for a single or several telematics/infotainment components, wherein the telematics/infotainment components may interact with each other and/or the application component. In particular, an application component may request a telematics/infotainment service from a specific telematics/infotainment component like the displaying of a video file to a passenger via a rear-seat display, and the specific telematics/infotainment component, in this case the rear-seat display, will provide the requested service in interaction with other telematics/infotainment components, for instance an on-board hard disk drive. The service may also be provided by multiple application components for a single or several telematics/infotainment components.

As mentioned above, head units and telematics/infotainment services, which can be provided to the user by the head units, are generally limited to those services which can be provided by the telematics/infotainment components (including certain software applications) installed in the vehicle at the time of delivery. Consequently, IVI systems without a pre-installed on-board telephony system, a voice command system, a DAB/DVB receiver or a vehicle navigation system, for instance, cannot provide on-board telephony, voice operation, DAB/DVB or navigation information services, respectively, in a simple way, without the addition of complicated and often costly external devices. Even if such devices are available, compatibility issues with hardware, e. g. connectors, or software, e. g. the API installed on the head unit, limit the applicability of external devices to vehicles fulfilling only a minimum set of requirements. With the rapid development of consumer electronics, and in particular of services and apps, which may be of interest in an automotive environment, the feature gap between what is possible considering up-to-date CE devices and what can actually be implemented based on the minimum set of requirements for the head unit continues to diverge. By way of example, controlling apps of a smart phone, which are specifically designed for use with an IVI system, via input units of the IVI system, such as a touch screen or a trackball, is generally precluded due to incompatibilities of the software and/or protocols used by the involved mobile communication device and head unit.

The removable device according to the present disclosure tries to bridge this gap by providing an inexpensive, versatile item which mediates between the specifications (hardware and software) of existing and future head units and the fast developing service applications of CE devices. Using separate communication modules, it provides a way to transmit data between a head unit and a mobile communication device, even if their transmission methods and protocols are incompatible. The control unit provided with the removable device specifically acts as an interpreter which uses data received via the second communication module to provide at least one service to the head unit via the first communication module. Here and in the following, the term "data" may always comprise actual data, like music or video data, and dedicated control data, e. g. control signals needed for operating the head unit or mobile communication device as well as specific applications executed by these devices. Consequently, the control unit of the removable device may be adapted to receive data from the mobile communication device via the second communication module and pass it on to the head unit via the first communication module in a way and format, which can be received and processed by the head unit. Equally, the control unit may be adapted to receive data from the head unit via the first communication device and pass it on to the mobile communication device via the second communication module in a way and format which can be received and processed by the mobile communication device. This particularly includes control data, e. g. received from a touch screen, trackball, joystick or other input device of the IVI system, for accessing specific data, like music, picture, or video data, and/or for controlling a specific app on the mobile communication device. Consequently, a user may access functions of the mobile communication device, such as a navigation function or a voice command function of a smart phone, directly through controls of the IVI system of the vehicle.

The removable device thus acts to provide a service, which is available through the functionality of the connected mobile communication device, to the head unit and through it to the user of the vehicle. The term "service" in this context shall be understood as a telematics/infotainment service as defined above which relies on a function, in particular data, of the mobile communication device. As an example, such a service may facilitate the propagation of the display content of a smart phone to the display of the IVI system and in return propagate control data, e. g. a selection by touch, back to the smart phone. The at least one service is, however, not limited to such mirroring of display contents and propagation of control signals but also includes the propagation of specific vehicle data, as available to the IVI system and the head unit, to the mobile communication device for further processing. As such, vehicle data such as speed, fuel consumption, GPS location, mileage, or the like, may be passed to the mobile communication device, where dedicated apps may process the data, for instance to provide a statistical analysis, a logging functionality or the like. Consequently, the user can partake in the rapid development of apps available for mobile communication devices without having to update interfaces or even the entire head unit. Furthermore, the removable device can provide additional services due to optional hardware components of the device, which are neither provided by the mobile communication device nor by the IVI. By way of example, the removable device may provide an additional runtime environment for mobile apps, including those of the mobile communication device, enhanced connectivity to mobile phones or cameras, which do not come with a connectivity module compatible with the built-in module(s) of the head unit, or direct connectivity to a mobile telecommunication network (see below). To this end, the control unit of the removable device is more than a simple bridge between the first and second communication modules, but provides its own runtime environment. Finally, retrofitting a vehicle with non-standard or non-compliant equipment, such as rear/front-view cameras or a head-up display unit, becomes possible without modifications of the head unit through the use of the removable device (see below).

The first and the second communication module may each be configured to enable bi-directional communication of data via at least one connectivity model chosen from the following group of models: wired connections via USD, HDMI, and/or Lightning connector/Thunderbolt, or the like, and wireless connections via Bluetooth, Wi-Fi, and/or CWUSB, or the like. Each communication module may feature more than one connectivity model. The connectivity models of the first and second communication modules may be the same or may differ. The removable device, in particular its control unit, may further be adapted to perform communications via the first and second communication modules alternately and/or simultaneously. The latter option allows streaming of video contents stored on the mobile communication device to a display of the IVI system as well as hands-free telephone connections via the mobile communication device using IVI components, such as speakers and a microphone.

In one particular embodiment, the control unit may be further configured to process the data received via the second communication module. Similarly, the control unit may process the data received via the first communication module or any further communication module. Thus, the control unit processes data received from one communication module before providing data, which is generated based on the processing, to another communication module for transmission. The processing may in particular include a processing of data to be passed on in order to comply with data specifications of the receiving device, e. g. the head unit or the mobile communication device. The processing may thus include reformatting and/or packaging of data, such as music or video data, and/or mapping of non-generic control signals of the sending device, e. g. the head unit, to corresponding control signals of the receiving device, e. g. the mobile communication device. The way, in which data and control signals are processed by the control unit of the removable device, may particularly be implemented in terms of software and thus be updatable in an easy way. Even if implemented in terms of hardware, the inexpensive removable device may be simply replaced by a newer model to accommodate newer developments in consumer electronics.

In a further embodiment, the removable device may further comprise a memory unit storing an application programming interface (API), which implements at least a first protocol for the communication with the head unit via the first communication module and a second protocol for the communication with the mobile communication device via the second communication module, wherein the control unit comprises at least one processing unit adapted to execute the API. In particular, the first and second protocols may be different protocols. Alternatively, the same protocol may be implemented by means of the API for both communications via the first and the second communication module. The at least one processing unit may be any kind of electronic processing device, particularly a CPU or GPU as used in embedded systems. The memory unit may in particular comprise a non-volatile memory, such as a flash memory, EPROM, EEPROM or other non-volatile memory known in the art, such that the API can be stored in the memory unit in a non-volatile fashion. Preferably, the memory unit may at least comprise an erasable and programmable read-only memory section (EEPROM) to allow for updates of the API at a later time. The at least one processing unit may include a dedicated application processor for executing the API and one or several applications building on the API.

As described above, the API includes at least a set of routines and/or software tools for implementing at least the first and second protocols for the communications with the head unit and mobile communication device, respectively. The API of the removable device is thus matched by a corresponding API of the head unit, which is executed on a processing unit of the IVI system to implement at least one protocol for the communication with the removable device, and likewise by an API of the mobile communication device, which is executed on a processing unit of the mobile communication device to implement at least one protocol for the communication with the removable device. The API of the removable device may implement different protocols for communication with different mobile communication devices, such as iPhones using Apple's CarPlay and Android based smart phones using Google Auto Link (GAL). Additionally, different protocols may be implemented by the API to accommodate different techniques of data transmission such as Bluetooth, Wi-Fi, USB, CWUSB and HDMI. The implemented protocols may thus include rules relating to the transmission technique and rules relating to the data specifications of the receiving/sending device. The API may implement multiple protocols for communications via one or several communication modules/techniques. Alternatively, multiple APIs may be stored in the memory unit, each dedicated to a particular protocol and/or communication module/technique.

In addition to implementing the protocol for the communication with the head unit and mobile communication device, the API may implement a set of routines and/or tools, e. g. in the form of a library, for the execution of one or several applications within the runtime environment, i. e. on the at least one processing unit, of the removable device itself. For example, an application providing hands-free telephony via a further communication module for connecting the removable device to a mobile telecommunication network may be executed using the API of the removable device. As such, the API may comprise routines for speech recognition to provide voice command operation as a telematics/infotainment service, even if such routines are not foreseen in the IVI system of the vehicle itself. The applications to be executed on the processing unit of the removable device may be stored in the memory unit and updated upon demand.

As already indicated, the control unit may be further configured to provide the at least one service by executing the API. At the least, such executing may implement the necessary protocols to pass data received from either the head unit or the mobile communication device on to the respective other device. In addition, the data may be processed as described above or dedicated applications may be executed using the API to provide additional functionality such as a media player for data stored on the mobile communication device or a connection to a cloud service via a corresponding communication module.

In one further embodiment, the removable device may further comprise a decoding unit configured to decode data, in particular video data, received from the mobile communication device and/or the head unit; and/or an encoding unit configured to encode data to be transmitted to the head unit and/or the mobile communication device. The decoding/encoding units may, for instance, be configured to decode/encode standard video formats, such as H.264 or H.265. They may generally decompress/compress video data and thus supplement video processing functionalities or computing power not available at the head unit or mobile communication device. In one particular embodiment, the decoding unit and/or the encoding unit may be integrated in the control unit or even as a part of the processing unit. Alternatively, the decoding unit and/or the encoding unit may be provided as a part of the respective communication module. Thus, more than one decoding unit and/or encoding unit may be provided.

In one further embodiment, the removable device may further comprise an authentication unit configured to perform an authentication process with the head unit via the first communication module. Additionally, the authentication unit may be configured to perform an authentication process with the mobile communication device via the second communication unit, or a dedicated further authentication unit for such an authentication process may be provided. The authentication unit may be integrated in the control unit and in particular be provided as part of the processing unit.

The authentication process may involve any of the authentication methods used in the art, like for instance, passwords, passphrases, passkeys, decryption keys, digital certificates, digital signatures, or any other authentication method. It may be desirable to place constraints on which removable devices may communicate with the head unit and which mobile communication devices the removable device may communicate with, in order to avoid misuse, e. g. of personal or proprietary contents. Also, more than one mobile communication device may be present in the vehicle while communication with the removable device shall be limited to one or several of the present devices. The authentication process may in particular be part of a firewall implemented in the control unit, e. g. in the API executed by the processing unit, and/or the head unit. Performing an authentication process, when establishing a connection between the removable device and the head unit or mobile communication device, also allows performing the respective communications via an encrypted channel, i.e. in an encrypted form. Any known method of cryptography, like for instance, public key cryptography, asymmetric key cryptography, Diffie-Hellman keys, digital signature algorithms, elliptic curve techniques, password-authenticated agreement techniques, the Paillier cryptosystem, RSA encryption algorithms, SSH, Cramer-Shoup cryptosystem, identity based encryption (IPE), link keys, wired equivalent privacy (WEP), Wi-Fi protected access (WPA, WPA2), pre-shared keys (PSK), or similar may be used.

As an alternative to an authentication unit, the removable device, head unit, and mobile communication device may each run an application or app in an application layer on their respective processing unit to carry out the authentication process and optional encryption. By carrying out the encryption in the application layer, using technologies like SSL, SSH, GnuPG, PGP, or the like, the application run by the respective device provides end-to-end encryption wherein all traffic between the head unit/mobile communication device and the removable device is encrypted. End-to-end encryption generally reduces the risk of unauthorized people spying on the traffic between the communication partners.

In one further embodiment, establishing a communication between the removable device and the head unit and/or mobile communication device may comprise establishing a Bluetooth connection. Any available Bluetooth technology may be used, in particular, Bluetooth version 2.1 and up and Bluetooth coupled with Wi-Fi. Bluetooth is a packet-based protocol with a master-slave structure. A master Bluetooth device can communicate with a maximum of seven devices. At any given time, data can be transferred between the master and one other device, except for the broadcast mode. As an example, the head unit may be configured as the master while the removable device connected to it may be configured as a slave. Connection of the removable device to the head unit may be initiated from either the removable device, or the IVI system, and may involve the discovery of Bluetooth enabled devices within range. Use of a service of a Bluetooth device may require pairing or acceptance by its owner. Establishing the Bluetooth connection may for instance comprise Secure Simple Pairing (SSP) of the removable device and the head unit. Secure Simple Pairing (SSP) has been available since Bluetooth version 2.1. For security reasons, it may be necessary to recognize specific devices and thus enable control over which devices, here, removable devices, are allowed to connect to a given Bluetooth device, here, the head unit of the IVI system. At the same time it may be useful for Bluetooth devices like the removable device and the head unit to be able to establish a connection without user intervention. Similar configurations may be applied to the connection between the removable device and the mobile communication device. Due to the provision of separate communication modules, the removable device may act as both master and slave in different communications. For example, the removable device may be configured as slave in the communication with the head unit while it is configured as master in the communication with the mobile communication device. The different roles are coordinated by the control unit of the removable device.

In one further embodiment, connecting the removable device to the head unit of the IVI system may comprise establishing a Wi-Fi connection. The Wi-Fi connection may be established using any of the secure protocols for wireless communication known in the art, like for instance, wired equivalent privacy (WEP), Wi-Fi protected access (WPA and WPA2), pre-shared key (PSK), extensible authentication protocol (EAP), light weight extensible authentication protocol (LEAP), protected extensible authentication protocol (PEAP), end-to-end encryption or similar. Connecting a removable device to the head unit via Wi-Fi may require authentication on the side of the removable device and/or the side of the head unit, similar to the above described authentication of a Bluetooth connection. The authentication process may be carried out by the above described authentication unit. Even in the case that the removable device is directly connected to the head unit by plugging it into a USB and/or HDMI connector (see below) of the IVI system, i.e. via cable, an authentication process may be performed to prevent unauthorized access to vehicle functions and/or data.

In one further embodiment, the first communication module may comprise a first connector, in particular a USB and/or an HDMI connector, adapted to connect the removable device with the head unit; and/or the second communication module may comprise a second connector, in particular a USB and/or an HDMI connector, adapted to connect the removable device with the mobile communication terminal. USB and HDMI are wide spread standards in both the field of consumer electronics and automotive infotainment. Thus, many existing vehicles already come equipped with a USB and/or HDMI port as part of the infotainment system or head unit. The present embodiment makes use of the ubiquity of these connectors to present a removable device that can be easily connected to the head unit of a vehicle by a user in a Plug&Play style. If available, a Thunderbolt/FireWire connection may be used as an alternative to connect the removable device to the head unit and/or the mobile communication device. A combined USB/HDMI connector may also be used to profit from the high speed data link of an HDMI connection and the versatile connectivity of the USB connection at the same time. The latter even allows powering the removable device directly through the connection with the head unit.

According to this embodiment, connectivity with the head unit and/or the mobile communication device is provided via a wired connection by means of a corresponding connector. The transceiver of the respective communication module receives and transmits data via the connector from and to the head unit or the mobile communication device, respectively.

In the case of a USB connector, the communication module may comprise a dedicated USB transceiver as well as a USB controller. The USB controller may be a microprocessor plus USB SIE (Serial Interface Engine), an integrated microprocessor/USB chip, or an ASIC connected to the USB transceiver. In a standard USB setting, one of the connected devices generally assumes the host role that controls the communications, while the other device assumes the function role that provides services to the host. In the present embodiment, the head unit may be configured as the host or master while the removable device assumes the role of the slave with respect to the first communication module. As already mentioned, the provision of a separate second communication module, however, allows the removable device to assume the role of the host for the communication with the mobile communication device at the same time. The specific design of the removable device with a control unit as a mediator between the first and second communication modules reconciles the two roles without conflict. In addition, the removable device may serve as a USB hub, which allows connecting multiple devices to the removable device at the same time.

Alternatively, the first and/or second communication modules may be configured to assume a dual-role or multi-role using USB On-The-Go (USB OTG). By providing a corresponding OTG controller as part of the respective communication module, the removable device can perform both the master and slave roles through this module. As a multi-role device, the removable device can even operate as one or more hosts and one or more peripheral devices— either independently or simultaneously. Applied to the second communication module, such a multi-role configuration allows connecting a plurality of mobile communication devices and/or other devices assuming different roles to the removable device at the same time. For example, a smart phone may be connected to the removable device in the role of a peripheral device (slave) to provide access to video data stored on the smart phone, while a head-up display unit, which will be described later, is connected to the removable device via CWUSB in the role of a host to access navigation information provided to the removable device by the head unit. Provision of an OTG controller as part of the first and/or second communication modules allows for versatile connections to corresponding USB OTG head units and/or mobile communication devices.

Using a USB OTG connection, communication between the removable device and the connected device represents a point-to-point connection. According to the USB OTG supplement to the USB 2.0 specifications, an Attach Detection Protocol (ADP) is used to detect attachment of a USB device, a Session Request Protocol (SRP) allows both communicating devices to control when the link's power session is active, and a Host Negotiation Protocol (HNP) allows the communicating devices to exchange their host/peripheral roles as well as to determine the initial host. A Targeted Peripheral List may be used by the OTG controller to specify which types of USB peripherals may be connected. This may be particularly relevant with respect to USB peripherals which are not self powered. Typical USB peripherals which may be connected to the removable device via the second communication module are mobile phones, PDAs, digital cameras, portable storage devices such as MP3/MP4 players, portable navigation devices, digital video cameras, digital audio players and the like. Many of these devices may be battery powered while others can be connected to a power supply of a vehicle such as the cigarette lighter socket. For such self powered devices, supplying 8 mA through the USB connector of the second communication module generally suffices while battery powered devices may require 500 mA (USB 2.0) or 900 mA (USB 3.0).

USB controllers, whether with or without the OTG supplement, provide data transfer in the form of packets, wherein the three main types of packets include token packets, data packets, and hand-shake packets. In addition, an application packet extractor may be provided as part of the communication module or the control unit to specifically wrap and extract application data and commands in and from USB application packets such that the application packet extractor supports only application related packets. Transmission of application packets may for instance be used to establish a dedicated communication between an application executed by the processing unit of the control unit and the head unit to provide an application specific service to the head unit. A USB controller further facilitates a guaranteed data exchange rate by means of isochronous transfer of data. In this transfer mode, real-time services like telephony or video streaming may be provided by the removable device through the USB connector of the first communication module. Other common transfer modes include bulk transfer, e. g. for the upload/download of files to/from the head unit, and control transfer or interrupt transfer to provide control signals from the head unit to the removable device and/or the mobile communication device. While USB 2.0 provides up to 480 MBit/s, USB 3.0 provides up to 5 GBit/s, sufficient for all major infotainment services.

Alternatively or additionally, the first and/or second communication modules may comprise an HDMI connector. An HDMI connector allows for very high data transfer rates up to 8.16 Gbit/s (HDMI 1.4) which are particularly suitable for the streaming of video contents. As such, an HDMI connector may be used to provide a video streaming service by the removable device, where the video data is stored on a mobile communication device or a mass storage device, which is connected to the second communication module of the removable device via an HDMI connector.

The first and/or second communication modules may alternatively or additionally be equipped with a wireless transceiver for wireless communication with the head unit and/or the mobile communication device. A wireless USB (CWUSB) transceiver may be used to connect the removable device to a plurality of peripheral devices and/or the head unit using OFDM technology. As with the wired USB connector, a wireless USB communication module may be configured as a host, slave or dual-role device using the corresponding USB controller. Furthermore, a Wi-Fi module with antenna unit may be comprised in the first and/or second communication modules to provide wireless communications with the head unit and/or mobile communication devices.

In one further embodiment, the removable device may further comprise a power supply element, in particular a power supply connector, configured to receive power supplied by the vehicle. Operation of the control unit, in particular the at least one processing unit, and potential other units of the removable device requires power. In addition, the removable device may be required to provide power to connected devices, such as the mobile communication device, through the second communication module. While the removable device may be equipped with a power storage unit, such as a (rechargeable) battery, to provide power to the components of the removable device for a certain period of time, the removable device according to this embodiment receives power supplied by the vehicle through a power supply element. In the simplest case, this power supply element may comprise respective wires of a connector by which the removable device is connected to the head unit. As an example, USB connectors at the same time provide data and power connections in order to at least partly power connected peripheral devices. As mentioned above, up to 500 mA (USB 2.0) or 900 mA (USB 3.0) may be provided through the first communication module to the removable device by the head unit, which generally suffices to power the components of the removable device itself. If required, e. g. to provide significant processing power of the processing unit(s) of the removable device, the power supply element may comprise a connector to a power supply of the vehicle such as the cigarette lighter socket. Such power supply may also be needed to indirectly power connected USB devices through the second communication module of the removable device. The power supply element may be provided as a part of the first communication module, in particular as a part of a USB connector of the first communication module.

In one further embodiment, the second communication module may be further configured for communication with an auxiliary infotainment device, such as a front-view camera, a rear-view camera, or a head-up display. As repeatedly mentioned, other devices, different from a mobile communication device, may be connected and accessed via the removable device. Those devices include CE devices, not comprising mobile communication functionality, such as digital cameras, digital video cameras, MP3/MP4 players or and other known digital audio players, mass storage media, flash storage media, or the like. However, even infotainment devices which may normally be provided as an integral part of the in-vehicle infotainment system may be retrofitted in a simple and inexpensive way to IVI systems of vehicles not having these components by means of the above described removable devices. As an example, a front-view camera and/or rear-view camera may be retrofitted to an IVI system equipped with a display by means of the removable device. The respective camera is connected to the second communication module according to the present embodiment for communication via the second transceiver or a dedicated further transceiver. Communication may in particular be performed wirelessly to reduce installation complexity and cost for the camera. The video data taken by the front-view/rear-view camera may thus be provided to the head unit and a display of the IVI system in a simple way by means of the removable device. Overall retrofitting costs may be kept low as compared to a complete upgrade of the head unit and/or IVI system for use with a front-view/rear-view camera.

A further example is given by a retrofitted head-up display. A projection unit of a typical head-up display may be retrofitted to a vehicle in an inexpensive way. The projection unit may then be connected to the removable device via the second communication module of the removable device. As a consequence, vehicle data or navigation data provided by the IVI system and the head unit of the vehicle may be provided to the projection unit by means of the removable device to have the corresponding image data be projected onto the windshield of the vehicle. The control unit of the removable device may in particular process the raw data received from the head unit into corresponding image data to be provided to the projection unit. Thus, no further changes to the head unit of the vehicle are needed. Even if the IVI system of the vehicle does not come with a navigation component, the removable device may be configured to provide navigation data received via the second communication module, e. g. from a portable navigation device, to a projection unit of a retrofitted head-up display. Consequently, plenty of options to extend existing telematics/infotainment services of a vehicle by means of the removable device and corresponding auxiliary devices become available, thus bridging the feature gap between CE development and automotive release cycles.

In a particular embodiment, the removable device may further comprise a third communication module configured for bi-directional communication of data with a wireless network, in particular a mobile telecommunication network. To this end, the third communication module comprises a wireless transceiver, in particular for communication with a mobile telecommunication network, and the required antenna(s). Data, in particular voice data, may be received and sent via the third communication module, e. g. to provide a hands-free telephony service to the user of the vehicle. To enable the removable device to access mobile telecommunication services, such as telephony, text messaging or internet access, of a provider of such services, the removable device may be equipped with a subscriber identity module (SIM card). Consequently, even IVI systems not having such a SIM card may easily be retrofitted for the above mentioned mobile telecommunication services by means of the removable device. Changes in mobile telecommunication technology, e. g. MIMO, SIM cards, or even national peculiarities of mobile communication technology, may be addressed by replacing the removable device with a different or newer version featuring the required components.

It shall be understood that the present disclosure also includes combinations of the above described embodiments as well as embodiments where some components of the removable device are substituted by other described components. As an example, a removable device may be designed where the second communication module is replaced by the above described third communication module such that the removable device is dedicated to the provision of mobile telecommunication services. Also, a removable device which only provides connectivity with one or several auxiliary devices via its second communication module without providing connectivity to a mobile communication device may be devised to retrofit specific components to the IVI system of a vehicle. A plurality of alternative embodiments are imaginable as long as the removable device comprises separate first and second communication modules which are controlled by a control unit for exchange of processed data between the connected head unit and external device.

The present disclosure further includes the use of the removable device according to any of the above described embodiments to connect a mobile communication device to a head unit of a vehicle, wherein data stored on the mobile communication device is accessed from the head unit via the removable device.

Equivalent modifications and extensions as described above with respect to the removable device may also be applied to the use of the removable device according to the description above. In particular, the mobile communication device may be a smart phone and data stored on the mobile communication device may include audio data and/or video data. According to this embodiment, data stored on the mobile communication device is accessed by the head unit via the removable device. To this end, data and control signals are exchanged between the head unit and the mobile communication device by means of the first and second communication modules and the control unit of the removable device. The control unit is in particular adapted to perform necessary transformation and/or mapping processes on data, potentially including control signals, received from one device before transmitting the processed data to the other device. Consequently, the above described input units of the IVI system of the vehicle may be used to navigate through data stored on the mobile communication device and to access specific data such as music or video files or video streams.

According to one embodiment, the removable device may be used to transmit such control signals from the head unit to the mobile communication device. Data received at the head unit from the mobile communication device via the removable device may for instance be used to display a selection screen with available music tracks and/or videos on the display of the IVI system. In return, control signals indicating the selection of a particular item, e. g. by means of a touch input on the display or a user input via trackball or joystick, may be processed and communicated to the mobile communication device by the removable device to initiate transmission of the corresponding data by the mobile communication device. A plurality of alternative use cases, as described above, may be considered.

The present disclosure further includes the method for connecting a mobile communication device to a head unit of a vehicle, which comprises the steps of: establishing a first connection between a removable device and the head unit for bi-directional communication of data via a first communication module of the removable device; establishing a second connection between the removable device and the mobile communication device for bi-directional communication of data via a second communication module of the removable device; and providing at least one service to the head unit via the first communication module based on data received via the second communication module using a control unit of the removable device. Equivalent modifications and extensions as described above with respect to the removable device may also be applied to the method for connecting a mobile communication device to a head unit of a vehicle by means of the removable device. In particular, equivalent modifications and extensions may be applied to the first and second communication modules as well as the control unit of the removable device, the head unit of the vehicle and the mobile communication device employed in the process of connecting the mobile communication device to the head unit via the removable device according to the above described method. Furthermore, definitions of terms like "removable", "service", "data" and the like are used for the described methods in the above described meaning.

The set-up of the first connection may be initiated by the head unit or by the removable device, depending on the involved communication method. As an example, the head unit may initiate the set-up as a USB host if the first communication module of the removable device assumes the role of a USB slave. Similarly, the set-up of the second connection may be initiated by the removable device or by the mobile communication device, depending on the involved communication method. Here, the removable device may initiate the set-up, if the USB controller of the second communication module is configured as a USB host. Reference is made in this context to the extensive description of communication modules and methods presented earlier in this document.

In one particular embodiment, the method may further comprise processing the data received via the second communication module. As described above, such processing may be carried out by one or several processing units of the control unit of the removable device. Also, data received via the first communication module may be processed by such a processing unit. The processing may not only include data handling, like transformations, decompression, compression, decoding, encoding and the like, but also mapping of control signals between the corresponding specifications of the head unit and the mobile communication device. The control unit thus acts as a mediator between the head unit and the mobile communication device by processing received data before transmitting at least part of the processed data to the respective other device.

In one further embodiment, the method may further comprise executing an application programming interface, API, implementing at least a first protocol for the communication with the head unit via the first communication module and a second protocol for the communication with the mobile communication device, on the at least one processing unit of the removable device. Again, equivalent modifications and extensions as described above with respect to the API of the removable device may be applied to the method according to this embodiment. In particular, the first and second protocols may be the same or different protocols. The API may in particular be stored on a memory unit with non-volatile memory, from which required routines or applications are loaded into the memory of the processing unit. The first and second protocols may vary depending on the communication methods of the first and second communication methods and the API may further provide software for additional applications used to provide additional functionality. The present disclosure further comprises the step of updating at least part of the API by storing or installing an updated version on the non-volatile memory of the removable device. Consequently, new features may be added to the removable device and through it to the IVI system of the vehicle without having to exchange the entire device or even the head unit.

In one particular embodiment, the at least one service may be provided by executing the API as already described above. In particular, an application may be executed by the processing unit which is based on the API and which implements a service to be provided to the head unit.

In one further embodiment, the method may further comprise decoding data, in particular video data, received from the mobile communication device and/or the head unit, by the removable device; and/or encoding data to be transmitted to the head unit and/or the mobile communication device, by the removable device. The above described decoding and encoding units may be employed for these processes. By decoding H.264 or H.265 video data received from the mobile communication device, high quality videos or movies may be displayed on the in-vehicle display in a comfortable manner. Again, adding decoding/encoding functionality to the removable device alleviates potential constraints on accessible audio/video data formats due to outdated specifications implemented in a codec of the IVI system of a vehicle.

In another embodiment, the method may further comprise performing an authentication process between the head unit and the removable device via the first communication module. Equivalently, an authentication process may be performed between the removable device and the mobile communication device when establishing the connection via the second communication module. The authentication process may be performed by a dedicated authentication unit of the removable device and may be initiated by the device initiating the set-up of the respective connection. By performing an authentication process, access to data and/or services of the head unit, the removable device, and/or the mobile communication device may be restricted. Also, the method may include filtering data and access requests by either device through a firewall of the removable device and/or the head unit. Furthermore, data may be encrypted before transmission by an encryption process of the removable device, the head unit, and/or the mobile communication device.

In one further embodiment, the method may further comprise establishing a third connection between the removable device and an auxiliary infotainment device, such as a front-view camera, a rear-view camera, or a head-up display; and receiving data from the auxiliary infotainment device at the removable device and/or transmitting data from the removable device to the auxiliary infotainment device. The same modifications as described above for the removable device may also be applied to the method according to this embodiment. In particular, the third connection may be established via a third communication module of the removable device. If a wireless USB connection is used, the front-view camera/rear-view camera may be configured as a USB slave while the head-up display may be configured as a USB host. The removable device, in particular its API, may be adapted to implement the required transmission protocols for retrofitting a front-view/rear-view camera and/or a head-up display to the existing IVI system of a vehicle without major changes to the head unit or the IVI system.

In one further embodiment, finally, the method may further comprise establishing a fourth connection between the removable device and a wireless network, in particular a mobile telecommunication network, for bi-directional communication of data. A corresponding communication module, including the required components and antenna(s), may be provided as part of the removable device. A SIM card of the removable device may be used to access the mobile telecommunication network. By means of the removable device, hands-free telephony, text messaging and/or mobile internet access may be added to the IVI system of the vehicle even if the required hardware or software has not been installed in the IVI system.

A plurality of variants of the above described methods for providing additional functionality and services to the head unit of a vehicle may be contemplated. It shall be understood that exemplary components or processes disclosed in the context of the above described embodiments may be substituted or complemented by other suitable components or processes known in the art.

The present teaching provides an inexpensive device which can be installed in a vehicle by the end customer in a very convenient way (Plug&Play) at much lower cost than the traditional head unit upgrades. The removable device not only provides versatile and up-to-date access to smart phones implementing Apple's CarPlay or Google's Auto Link but also adds computational power and interfaces by expanding the IVI system with additional hardware and software components. The additional components together with the already existing in-vehicle infrastructure allow for enhanced end user experience generated, e. g. by an additional runtime environment for mobile apps, new Human Machine Interaction (HMI) features, enhanced connectivity to mobile phones or cameras, added navigation services, media player functionality, or cloud connection. The removable device is based on a scalable hardware and software architecture to allow for products ranging from a single purpose device, e. g. for connecting CarPlay or GAL phones, to multi purpose devices implementing multiple services, such as onboard navigation, enhanced connectivity, camera based applications and head-up display connection.

Some of the functionality of the removable device may also be employed in a different environment such as a home entertainment system or a television. The removable device may further be used to port software updates to a head unit of a vehicle in a convenient and safe way. If the removable device is integrated in a key fob form factor such as a car key, additional personalized sensors, such as biometric sensors may be included in the removable device. In addition, the removable device may be part of the standard keys that OEMs provide.

Further features and exemplary embodiments as well as advantages of the present invention will be explained in detail with respect to the drawings. It is understood that the present invention should not be construed as being limited by the description of the following embodiments. It should furthermore be understood that some or all of the features described in the following may also be combined in alternative ways.

A possible embodiment of an in-vehicle infotainment (IVI) system comprising a head unit is exemplified in the following with respect to FIG. 1. It shall be understood that the described components are merely intended as non-limiting examples of automotive telematics/infotainment components, wherein some components may be omitted or replaced by other telematics/infotainment components known in the art. Components 100 to 145 are installed in a vehicle, while components 150 to 161 are external components which are not part of the automotive IVI system but may interact with some of the telematics/infotainment components of the vehicle. Components 180 to 182 represent components which may temporarily be installed or located in the vehicle or retrofitted to the IVI system.

A vehicle equipped with an IVI system may contain a display 104, as a visual front end interface located in the vehicle. The user may also be able to interact with the interface via a touch sensitive screen, via pressing a button, via audible speech and speech synthesis, or other HMI (Human-Machine-Interaction) components known in the art. Interaction via audible speech and speech synthesis or analysis may be via a microphone 131 and an A/D converter 130 for receiving input from the user and via a D/A converter 120, an amplifier 121, and one or several speakers 122 for giving output to the user. The visual front end interface may be part of a head unit for a centralized interaction of the user with the IVI system or separate from a dedicated head unit 100.

In the illustrative embodiment shown in FIG. 1, a central head unit 100 controls at least a portion of the operation of the IVI system. To this end, the head unit may in particular comprise at least one processing unit, for instance a CPU or GPU. In addition, at least one further processing unit may be provided and assigned to a specific telematics/infotainment component or a group of telematics/infotainment components, as for instance a CPU 141 provided with a video display 142, possibly as part of a rear seat entertainment system for displaying movies from a storage device, like a hard disk drive 140. The processing unit of the head unit 100 allows on-board processing of instructions, commands, and routines, particularly as part of an application layer and/or API of the head unit. The head unit 100 may further be connected to both non-persistent and persistent storage devices 140. In this illustrative embodiment, the non-persistent storage device is a random access memory (RAM) and the persistent storage device is a hard disk drive (HDD) or flash memory.

The head unit 100 may also be provided with a number of different inputs allowing the user to interact with the head unit. In this illustrative embodiment, a microphone 131, an auxiliary input 132, a USB input 123, an HDMI input 125, a CWUSB input 126, a GPS input 133, and a Bluetooth input 102 are all provided. An input selector may be provided to allow the user to swap between various inputs. Input to the microphone 131 is converted from analog to digital by an A/D converter 130 before being passed to the head unit.

Outputs from the IVI system may include, but are not limited to, a video display 124 and a speaker 122 or stereo/surround system output. The speaker may be connected to an amplifier 121 and may receive its signal from the head unit 100 through a digital-to-analog converter 120. Output can also be made via the Bluetooth transceiver 102 with a Bluetooth antenna 103 to a remote Bluetooth device such as a personal navigation device or mobile communication device with a Bluetooth antenna. Communication with a personal navigation device can also be achieved via USB connector 123. The USB connector 123, HDMI connector 125, CWUSB connector 126, Bluetooth transceiver 102 may also be used to connect the head unit 100 to a removable device (not shown) according to the present disclosure.

The IVI system may further comprise a vehicle navigation device 134, which may interact with the GPS unit 133 and/or a mobile network 160 via a base station 150 and a multi-band antenna 110 or a mobile terminal (mobile communication device) 111. The mobile terminal 111 may particularly be a cell phone, smart phone, PDA, or the like and may be connected to the head unit 100 either directly, via a USB connector 123, via the Bluetooth transceiver 102 with its antenna 103 or in particular via the removable device (see below). The multi-band antenna 110 may exchange data with the head unit 100 either through a wire or wirelessly through a modem 101. Here, the base station 150 and the network 160 are not part of the IVI system but provided outside the vehicle. In some embodiments, the base station 150 may be a Wi-Fi access point.

Data may be communicated between the head unit 100 and the network 160 utilizing, for instance, a data-plan, data over voice, or DTMF tones associated with the mobile terminal. Both multi-band antenna 110 and the mobile terminal 111 may exchange data bi-directionally with the base station or Wi-Fi access point 150. The modem 101 may also communicate directly with a network 160 through communications with a cellular tower 150. As a non-limiting example, the modem 101 may be a USB cellular modem and the communication may be cellular communication.

The head unit 100 is provided with an operating system including an API which may enable communication with a modem application software. The modem application software may access an embedded module or firmware on the Bluetooth transceiver 102 to complete wireless communication with a remote Bluetooth transceiver (such as that of the mobile terminal 111). In another embodiment, the mobile terminal 111 may include a modem for voice band or broadband data communication. If the user has a data-plan associated with the mobile terminal 111, it is possible that the data-plan allows for broadband transmission and the IVI system could use a much wider bandwidth (speeding up data transfer). The mobile terminal 111 may be replaced with a cellular communication device (e.g., and without limitation, a modem 101), that is installed in the vehicle, or a removable device with a SIM card according to the description above. The mobile terminal 111 may be replaced with a wireless local area network (LAN) device capable of communication over, for example, an 802.11n network (i.e., Wi-Fi) or a WiMax network. In one embodiment, incoming data can be passed through the mobile terminal 111 via a data-over-voice or data-plan, through the on-board Bluetooth transceiver 102 and into the head unit 100.

Data, whether incoming or outgoing or temporary, may be stored on the HDD 140 or in the RAM 140 or any other storage media until such time as the data is no longer needed. The HDD 140 or other storage media may in particular be used as the memory for storing individual user data or data downloaded from an external provider or a mobile phone via the removable device. The communication with a remote server of an external provider may be performed via the modem 101, the multi-band antenna 110, the Bluetooth transceiver 102, the mobile terminal 111, or the removable device, e.g., via a mobile network 160 or a wireless network.

The head unit may further be in communication with a variety of other auxiliary infotainment devices 180, like a mobile communication device of a user. These devices can be connected through wireless 182 or wired 181 connections (such as a USB connection). In particular, auxiliary infotainment devices which are incompatible with the hardware and/or software infrastructure of the IVI system may be nevertheless connected to the head unit through the removable device. Also, or alternatively, the head unit 100 may be connected to a vehicle based wireless router 106, using for example a Wi-Fi transceiver 107. This could allow the head unit to connect to remote networks in range of the local router 106.

The head unit 100 may further interact with a radio, a CD player, or a DVD player 143 to provide audio and/or video data to the stereo system 122 and/or a video display 142. Audio and/or video may also be provided via the multi-band antenna 110, the mobile terminal 111, or the removable device from a mobile network 160, wireless network, or digital broadcast network 161 (Digital Audio Broadcast, Digital Video Broadcast) via a broadcast transmitter 151 outside the vehicle. Audio and video data may be downloaded or streamed through the above described connections. In the case of a download, the data may be temporarily or persistently stored in the HDD 140 or other storage device. A further processing unit 141 may later read the stored data from the HDD 140 and provide video and/or audio services through the vehicle's speaker system 122 or the video display 142.

The head unit 100 may further interact with a microphone 131 and the vehicle's speaker system 122 to provide hands-free telephony, e.g., via the mobile terminal 111 or the removable device. Similarly, the head unit 100 may interact with the mobile terminal 111 and vehicle diagnostics (not shown) to send an emergency call or a breakdown call. The head unit 100 may also interact with an engine control unit (ECU) 144 to control engine parameters or monitor the vehicle's engine. Similarly, the head unit 100 may interact with a powertrain control module (PCM) 144 and a series of sensor systems 145, like for instance but without limitation, a tire pressure monitoring system, a road condition sensor, a parking sensor, a temperature sensor, an ambient light sensor, and the like. Wired communications within the automotive IVI system may be carried out using MOST (Media Oriented Systems Transport), CAN (Controller Area Network), IEEE 1394, or other technologies known in the art.

Some of the standard infotainment (telematics) services which may be provided by the automotive IVI system are described in the following.

An application component may provide hands-free telephony in interaction with a microphone 131 and A/D converter 130 and the vehicle's stereo system, comprising speakers 122, an amplifier 121, and D/A converter 120, as well as a mobile terminal 111 or the removable device. The provided telematics/infotainment service may involve further application components, like for instance a speech recognition component or application components controlling a volume of the radio and/or display devices. Such further application components may, however, be provided as part of the software infrastructure of the removable device. A further application component may provide on-board navigation services in interaction with the GPS unit 133, the vehicle navigation device 134 or a personal navigation device, as well as the modem 101 and the multi-band antenna 110.

Further application components may provide audio services, such as AM/FM radio reception, In-Band On-Channel (IBOC) radio reception, or digital audio broadcast radio, and/or video services such as DVD/CD playback, HDD playback, digital video broadcast services, video-on-demand services, pay-per-view services, or video downloads/streams from the internet. Depending on the service, the mobile terminal 111 or the multi-band antenna 110 may receive data from a base station 150 or a broadcast transmitter 151. The playback of a video stored on a HDD 140 may also involve a further processing unit 141 and a further (rear) video display 142, wherein the further processing unit 141 handles most of the processing required for displaying a movie, while the application component on the central processing unit of the head unit 100 only monitors the success of the service, or the further processing unit 141 may even implement the application component itself.

As a further telematics/infotainment service, an application component may provide web access, e.g., for video downloads or streams, and/or email access, e.g., in interaction with the modem 101 and the multi-band antenna 110, the wireless router 106, or the mobile terminal 111. Through the mobile terminal 111 and/or the multi-band antenna 110, a further application may receive traffic information from a network 160, and propose a different route in interaction with a vehicle navigation device 134 and the GPS unit 133.

Finally, an application component may provide telematics/infotainment services relying on HMI (Human-Machine Interaction) like a touch sensitive screen, a mouse, a control stick, or trackball to play (online) games for instance, or browse through the monitoring system of the vehicle, to interact with the vehicle navigation device 134 or to operate a media station of the vehicle.

Many of the above described infotainment services rely on the presence of certain components of the IVI system which may not be included in the IVI systems of existing vehicles. As an example, existing IVI systems may not include a router 106 for WLAN connectivity, a modem 101, a multi-band antenna 110 for connections to a mobile communication network 160 or for reception of DAB/DVB services, or a rear seat display 142. Even a CD Player/DVD Player 143 or a storage device 140 may not be present. In particular, only few existing IVI system provide front-view/rear-view cameras or head-up displays. Furthermore, processing and displaying of vehicle data, e. g. from the ECU/PCM 144 or the sensors 145 is limited to the implemented software of the head unit 100 at the time of release of the vehicle. Nevertheless, most recent IVI systems feature at least a USB connector 123 and a display 104, possibly with touch functionality, or any other input device, such as a trackball or joystick for HMI. Furthermore, head units 100 generally come with a processing unit executing pre-installed applications in an application layer on top of a pre-installed API. Through minor software updates to these APIs, the above described removable devices can be connected to existing head units via their USB connectors or any other connectivity option, such as the HDMI connector 125, the wireless USB module 126, or other wireless modules 101, 102 and 106, if present. As the above described mediator between the vehicle's head unit and up-to-date CE devices, such as mobile phones, portable navigation systems, portable storage devices, media players, cameras, etc., and auxiliary (retrofitted) infotainment devices, such as front-view/rear-view cameras, head-up displays, DAB/DVB receivers and the like, the removable device vastly extends the number of infotainment services available to the user.

A nearly infinite number of infotainment services, which can be provided by the removable device itself or in interaction with one or more CE devices, are possible and the present teaching is not limited to the above described examples but may be applied to any CE device known in the art.

Figure 2:
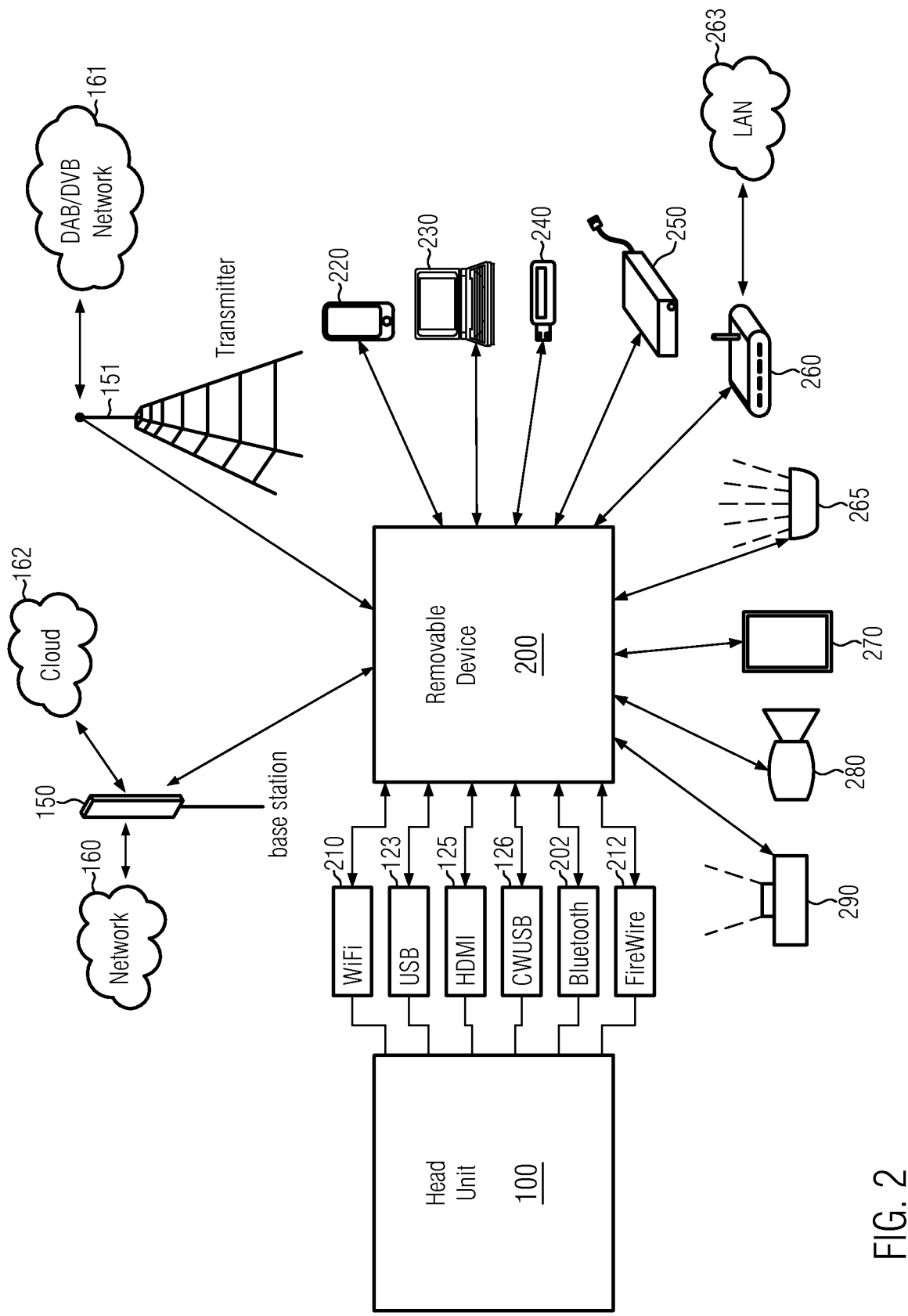
FIG. 2 shows an exemplary set of connections which can be established by a removable device according to the present disclosure.

A non-limiting set of CE devices and auxiliary infotainment devices which can be connected to the head unit 100 of a vehicle via the removable device 200 according to the present disclosure is shown in FIG. 2 in a schematic way. The removable device 200 may be connected to the head unit 100 via a Wi-Fi module 210, a USB connector 123, an HDMI connector 125, a wireless USB (CWUSB) module 126, a Bluetooth module 202, and/or a FireWire connection 212, if present at the head unit and the removable device. The removable device 200 may be installed by the user in a simple way by either plugging it into the corresponding USB connector 123, HDMI connector 125, FireWire connector 212, or any other suitable connector, or by wirelessly connecting it to the head unit by establishing a Wi-Fi, CWUSB or Bluetooth connection. The latter may automatically be initiated and set-up, once an authentication process has been carried out at least once. Through the established connection with the head unit 100, the removable device 200 exchanges data, particularly including control signals.

On the other hand, the removable device 200 may establish connections for data exchange with one or several devices of the following group: a cell phone 220, in particular a smart phone or a PDA, a tablet or laptop 230, a memory stick or a media (MP3/MP4) player 240, a mass storage device, such as an external hard disk 250, a router 260 for access to a LAN 263, a projection unit 265 of a head-up display, a portable navigation device 270, a front-view or rear-view camera 280, a digital camera or a digital video camera 290, or the like. In addition, the removable device 200 may connect to a base station 150, which may give access to a mobile telecommunication network 160 or a cloud network 262, and to a transmitter 151 of a DAB/DVB network 161. A nearly unlimited number of other CE devices can be thought of in this context. To enable communication of data with the mentioned devices, the removable device 200 may be equipped with the required communication module(s) and software. To add a new device to the list of devices, which can be connected to the removable device, a simple software update generally suffices. Even if modifications to the hardware of the removable device 200 are required, e. g. by adding a missing communication module, the small scale and inexpensive removable device 200 can easily be replaced with much less effort and at much lower cost than would be caused by a typical upgrade of the head unit 100. Consequently, the head unit 100 can profit from a nearly unlimited number of services, which are nowadays available in the market of consumer electronics.

Figure 3:
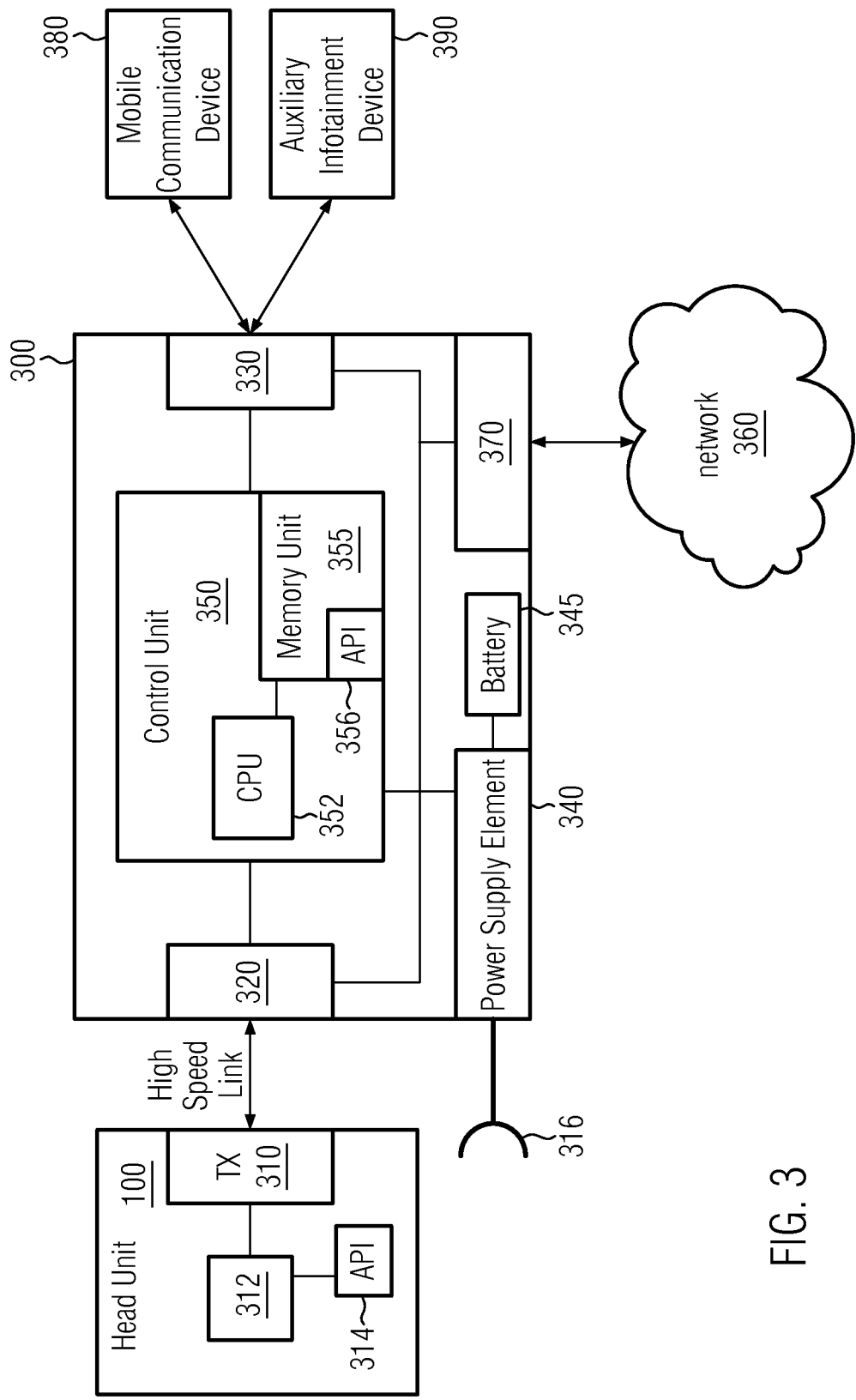
FIG. 3 shows an exemplary internal structure of the removable device.

FIG. 3 shows an exemplary internal structure of the removable device. The removable device 300 communicates with the head unit 100 via a first communication module 320 and a high speed link. In order to communicate with the removable device 300, the head unit too comprises a transceiver module 310, which may, however, be a standard module of current day head units. The transceiver module 310 itself is controlled by a processing unit 312 of the head unit which executes the API 314 of the head unit (see FIG. 5).

In addition to the first communication module 310 for exchange of data with the head unit 100, the removable device 300 comprises a second communication module 330 for communication with a mobile communication device 380 and/or an auxiliary infotainment device 390, and optionally a third communication module 370 for direct access, i. e. without the detour via a mobile communication device 380, to a mobile telecommunication network 360. Data received and transmitted via the first, second and third communication modules is processed by the control unit 350 of the removable device to comply with the data specifications of the connected devices. The processing is carried out by at least one processing unit 352 of the control unit, which, to this end, executes an API 356 and one or several applications building on this API. In the depicted, non-limiting example, the API 356 is stored in a memory unit 355 of the control unit 350. Using, for instance an EPROM or EEPROM memory, the API 356 can be stored persistently in the memory unit and yet be updated if needed. According to the present disclosure, the API 356 at least implements the protocols needed for the communication via the communication modules of the removable device. According to the present disclosure, the API 356 of the removable device is at least partly complemented by a corresponding API 314 of the head unit 100 to enable the data exchange between the head unit and the removable device. As this data exchange, however, requires only a small number of specifications in the involved protocol, essentially relating to the employed connection method and the data and control signals provided by the IVI system of the vehicle, the respective part of the APIs 314 and 356 can be defined at the time of release of the head unit.

In contrast hereto, a much larger number of specifications are needed for the API 356 with respect to the communications via the communication modules 330 and 370 due to the large number of potentially connected devices and services provided by these devices. It is this part of the API 356 and the corresponding applications installed in the memory unit 355 and executed by the processing unit 352 which accommodates the rapid development of consumer electronics. Frequent updates of the API 356 or replacements of the inexpensive removable device 300 can keep up with the fast release cycle of CE products. The removable device 300 is thus adapted to provide a larger number of services, such as hands-free telephony, text messaging, internet access, gaming, audio and video reproduction, etc., to the user by executing corresponding applications on the processing unit 352 and providing data compatible with the specifications of the head unit to a transceiver 310 of the head unit.

The removable device 300 may be powered by the head unit via the high speed link, e. g. via a USB connection. However, a dedicated power supply element 340 for supplying sufficient power to the communication modules 320, 330, and 370 as well as the control unit 350 may be provided, particularly if CE devices shall be powered by the removable device 300 through the communication module 330. The power supply element 340 may be connected via cable to a power socket 316, e. g. a cigarette lighter socket, of the vehicle. In addition, the removable device of this embodiment comprises a (rechargeable) battery 345 to bridge those periods where the vehicle's ignition remains turned off.

Figure 4:
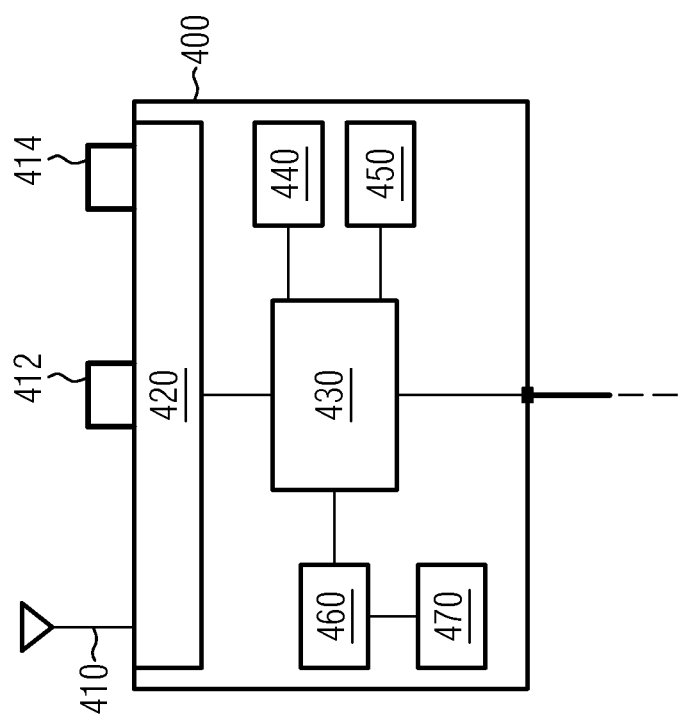
FIG. 4 shows an exemplary structure of a communication module of the removable device.

FIG. 4 shows an exemplary structure of a communication module of the removable device. The depicted, non-limiting structure may apply to any of the communication modules 320, 330, and 370. However, the communication modules 320, 330, and 370 may also differ in their internal structure, in particular with respect to the presence of a SIM card 470.

The exemplary communication module 400 comprises a transceiver 420 for exchange of data via a wireless antenna 410, a USB connector 412, and/or an HDMI connector 414. The wireless antenna 410 may be a Bluetooth antenna, a Wi-Fi antenna, or a multi-band antenna. One of the depicted connectors generally suffices. For larger bandwidth, the USB connector 412 and the HDMI connector 414 may be combined. The transceiver 420 is connected to the controller 430 which controls reception and transmission of data via the transceiver. In addition, the controller 430 may be connected to a decoding unit 440 and/or an encoding unit 450 for decoding and/or encoding the received data and the data to be transmitted, respectively. The decoding unit and encoding unit may further be combined in a single codec or implemented as a part of the controller 430. Furthermore, the communication module 400 comprises an authentication unit 460 which is configured to perform an authentication process. A memory storing an encryption key for the data transmission may be part of the authentication unit 460. For authentication with a mobile telecommunication network, the communication module 400 may comprise a SIM card 470 which may be accessed by the authentication unit 460. Again, the authentication unit 460 may be provided as a part of the controller 430. Also, several controllers may be provided to control several transceivers using different communication methods.

It shall be understood that the decoding unit, the encoding unit, the authentication unit and even the controller may be implemented as part of the central control unit 350 instead of being separately provided with the communication modules. Also, an encryption unit may be added and further components, like amplifiers, modulators, converters and the like, needed for the transmission and reception of data using a particular communication method may naturally be included. Transceivers and their infrastructure are well known in the art and are therefore not described in detail here. The received data is passed on to the control unit 350 of the removable device 300, from which data to be transmitted is also received by the controller 430.

Figure 5:
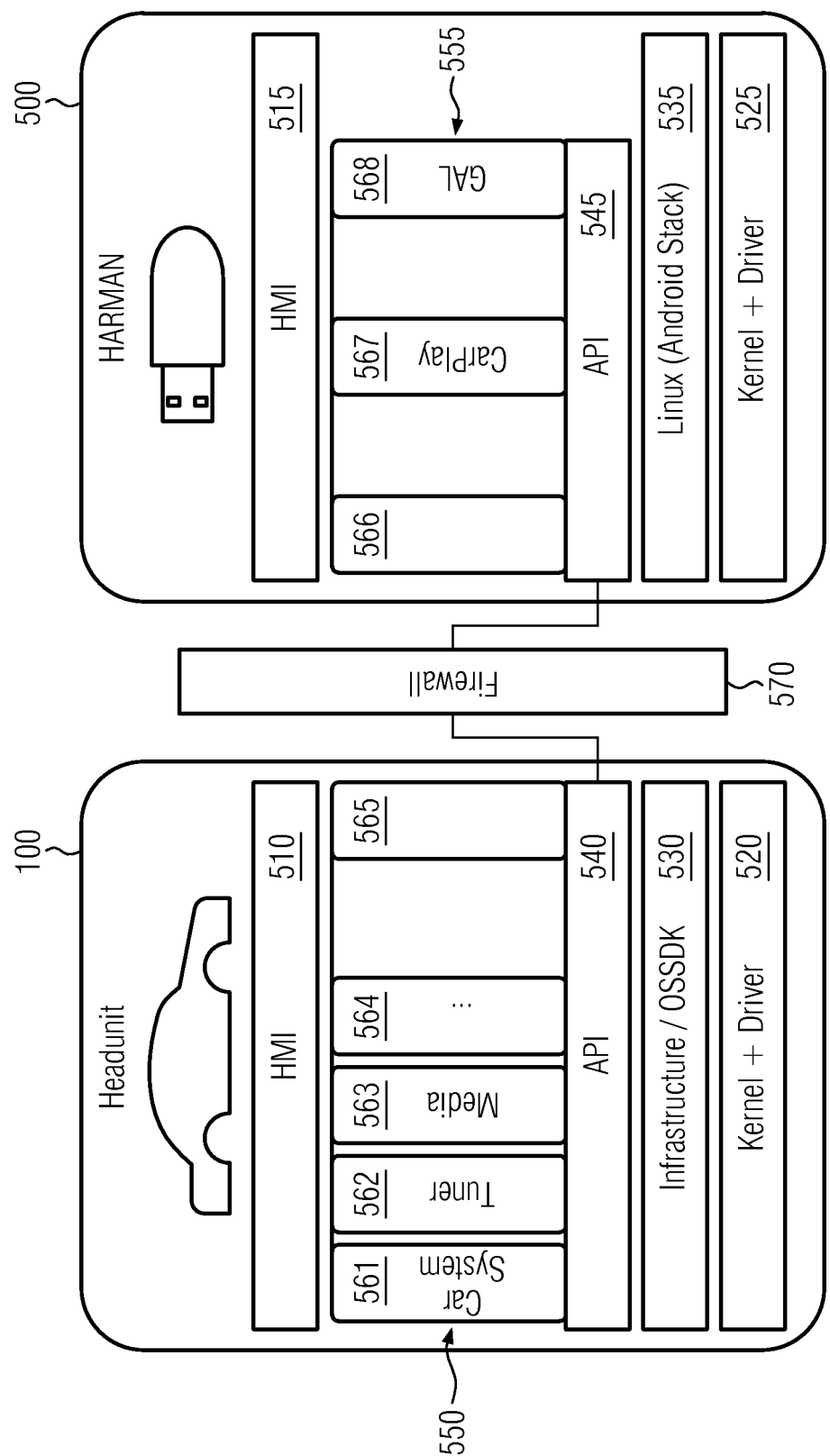
FIG. 5 shows an exemplary software structure of the head unit and the removable device.

FIG. 5 shows an exemplary software structure of the head unit and the removable device. It shall be understood that the particular software choices shown in this figure represent a non-limiting implementation which can easily be modified within the scope of the present disclosure. Only the above mentioned corresponding parts of the API 540 of the head unit 100 and the API 545 of the removable device 500 are required to enable the communication between these two devices.

Both software structures of the head unit 100 and the removable device 500 are built on a kernel together with a set of drivers 520 and 525. The kernel may be a Linux kernel or iOS kernel or any other kernel known in the art. The kernel and the drivers may in particular be provided as an embedded system with customized functionality. In addition to the kernel 520, the software architecture of the head unit 100 includes basic infrastructure 530 such as a software development kit of the operating system OSSDK. The non-limiting example shown in the figure uses a Linux infrastructure 535 for the removable device 500. As previously described, APIs 540 and 545 comprising a set of routines, libraries and tools for building a number of software applications, which can be executed by the processing units of the head unit and the removable device, provide the minimum functionality of implementing the protocol or protocols for the communication between the head unit 100 and the removable device 500.

The API 540 of the head unit 100 additionally provides the basis for a number of IVI telematics/infotainment applications, e. g. relating to the car system 561, the tuner 562, in-vehicle media 563 and so on 564, as part of an application package 550. These applications provide in-vehicle telematics/infotainment services by means of the telematics/infotainment components installed in the vehicle. A software interface for human-machine-interaction (HMI) 510 may for instance comprise a graphical user interface (GUI) for the interaction with the user. Finally, one or several specific applications 565 may be added to the software infrastructure of the head unit, which are particularly targeted at the interaction with the removable device. Such applications may for instance perform an encryption, encoding and/or compression process on data to be transmitted to the removable device. Also, data, such as control signals, to be transmitted to the removable device may be packetized, pre-formatted, and/or converted such that the corresponding application 566 of the removable device may understand them. As an example, converting control signals of the IVI system into the XML format allows for transmission of control signals which are not standardized in the communication protocol. Furthermore, the application 565 may decrypt, decode and/or extract data received from the removable device.

In the exemplary embodiment of FIG. 5, two software applications are integrated in the application package 555 of the removable device to implement Apple's CarPlay 567 and Google's Auto Link 568. Consequently, the same removable device 500 may be used to connect both iPhones and Android based phones to the head unit 100 without the need to provide a standardized communication protocol on the side of the IVI system. Similar to the head unit, one or several specific applications 566 may be added to the software infrastructure of the removable device, which are particularly designed for the interaction with the head unit. Such applications may perform the counterpart processes of the corresponding application 565 of the head unit, i. e. encryption/decryption, encoding/decoding, compression/extraction of data, as well as extraction and conversion of control signals. A vast number of further applications (not shown), which either directly provide a service to the head unit or provide a service in interaction with a CE device or auxiliary infotainment device connected to the removable device may be installed as part of the software infrastructure of the removable device. By means of a non-volatile, rewritable memory unit, such as EPROM or EEPROM, the software infrastructure of the removable device may frequently be updated in an easy way, e. g. by downloading corresponding updates via the connected mobile communication device. Finally, the removable device 500 may also be equipped with a software interface for human-machine-interaction (HMI) 515, which may, as an example, operate a fingerprint scanner of the removable device, used for authentication of a user.

In particular, the disclosure provides at least the following further aspects counted from one:

The aspect of a removable device, adapted to connect a mobile communication device to a head unit of a vehicle and comprising: a first communication module having a first transceiver and configured for bi-directional communication of data with the head unit; a second communication module having a second transceiver and configured for bi-directional communication of data with the mobile communication device; and a control unit configured to provide at least one service to the head unit via the first communication module based on data received via the second communication module.

The removable device according to the first aspect, wherein the control unit is further configured to process the data received via the second communication module.

The removable device according to the first aspect; further comprising: a memory unit storing an application programming interface, API, implementing at least a first protocol for the communication with the head unit via the first communication module and a second protocol for the communication with the mobile communication device; wherein the control unit comprises at least one processing unit adapted to execute the API.

The removable device according to the second aspect; further comprising: a memory unit storing an application programming interface, API, implementing at least a first protocol for the communication with the head unit via the first communication module and a second protocol for the communication with the mobile communication device; wherein the control unit comprises at least one processing unit adapted to execute the API.

The removable device according to the third aspect, wherein the control unit is further configured to provide the at least one service by executing the API.

The removable device according to the first aspect, further comprising: a decoding unit configured to decode data, in particular video data, received from the mobile communication device and/or the head unit; and/or an encoding unit configured to encode data to be transmitted to the head unit and/or the mobile communication device.

The removable device according to the first aspect, further comprising: an authentication unit configured to perform an authentication process with the head unit via the first communication module.

The removable device according to the first aspect; wherein the first communication module comprises a first connector, in particular a USB and/or an HDMI connector, adapted to connect the removable device with the head unit; and/or wherein the second communication module comprises a second connector, in particular a USB and/or an HDMI connector, adapted to connect the removable device with the mobile communication terminal.

The removable device according to the first aspect, further comprising: a power supply element, in particular a power supply connector, configured to receive power supplied by the vehicle.

The removable device according to the first aspect, wherein the second communication module is further configured for communication with an auxiliary infotainment device, such as a front-view camera, a rear-view camera, or a head-up display.

The removable device according to the first aspect, further comprising: a third communication module configured for bi-directional communication of data with a wireless network, in particular a mobile telecommunication network.

The removable device according to the first aspect, wherein data stored on the mobile communication device is accessed from the head unit via the removable device.

The removable device according to the eleventh aspect, wherein control signals are transmitted from the head unit to the mobile communication device via the removable device.

The aspect of a method for connecting a mobile communication device to a head unit of a vehicle, comprising the following steps: establishing a first connection between a removable device and the head unit for bi-directional communication of data via a first communication module of the removable device; establishing a second connection between the removable device and the mobile communication device for bi-directional communication of data via a second communication module of the removable device; and providing at least one service to the head unit via the first communication module based on data received via the second communication module using a control unit of the removable device.

The method according to the fourteenth aspect, further comprising: processing the data received via the second communication module.

The method according to the fourteenth aspect, further comprising: executing an application programming interface, API, implementing at least a first protocol for the communication with the head unit via the first communication module and a second protocol for the communication with the mobile communication device, on at least one processing unit of the removable device.

The method according to the fifteenth aspect, further comprising: executing an application programming interface, API, implementing at least a first protocol for the communication with the head unit via the first communication module and a second protocol for the communication with the mobile communication device, on at least one processing unit of the removable device.

The method according to the sixteenth aspect, wherein the at least one service is provided by executing the API.

The method according to the fourteenth aspect, further comprising: decoding data, in particular video data, received from the mobile communication device and/or the head unit, by the removable device; and/or encoding data to be transmitted to the head unit and/or the mobile communication device, by the removable device.

The method according to the fourteenth aspect, further comprising: performing an authentication process between the head unit and the removable device via the first communication module.

The method according to the fourteenth aspect, further comprising: establishing a third connection between the removable device and an auxiliary infotainment device, such as a front-view camera, a rear-view camera, or a head-up display; and receiving data from the auxiliary infotainment device at the removable device and/or transmitting data from the removable device to the auxiliary infotainment device.

The method according to the fourteenth aspect, further comprising: establishing a connection between the removable device and a wireless network, in particular a mobile telecommunication network, for bi-directional communication of data.

The present application provides a versatile and inexpensive removable device which can be added to the IVI system in a very convenient way. Instead of upgrading the head unit of a vehicle, such a removable device provides a flexible way to add hardware and new functionality to the IVI system of the vehicle and thus bridges the gap between fast evolving CE devices and automotive release cycles.

The invention claimed is:

1. A removable device, adapted to connect to a head unit of a vehicle and comprising:
   a first communication module configured for bi-directional communication of data with the head unit;
   a second communication module configured for bi-directional communication of data with a wireless network, wherein the wireless network comprises a mobile telecommunication network;
   a memory unit storing at least one application and an application programming interface (API) implementing at least a first protocol for the communication with the head unit via the first communication module and at least one of a set of routines or a set of tools for execution of the at least one application by a control unit of the removable device; and
   the control unit comprising at least one processing unit adapted to execute the API, wherein the control unit is configured to provide at least one service to the head unit via the first communication module, and wherein the control unit is further configured to provide a runtime environment for mobile apps to the head unit and communicate with the head unit via the first communication module to perform an authentication process with the head unit and to perform encryption of the communication with the head unit in an application layer.

2. The removable device according to claim 1, wherein the control unit is configured to provide the at least one service to the head unit via the first communication module by executing the at least one application using the API.

3. The removable device according to claim 1, wherein the control unit is further configured to provide a Human-Machine-Interaction (HMI) service to the head unit via the first communication module.

4. The removable device according to claim 1, further comprising:
a third communication module configured for bi-directional communication of data with a mobile communication device;
wherein the control unit is further configured to provide the at least one service to the head unit via the first communication module based on data received via the third communication module.

5. The removable device according to claim 1, further comprising at least one of:
a decoding unit configured to decode data received from at least one of the wireless network or the head unit;
an encoding unit configured to encode data to be transmitted to at least one of the head unit or the wireless network; or
a power supply element configured to receive power supplied by the vehicle.

6. The removable device according to claim 5, wherein the decoding unit is configured to decode video data received from at least one of the wireless network or the head unit.

7. The removable device according to claim 5, wherein the power supply element is a power supply connector, configured to receive power supplied by the vehicle.

8. The removable device according to claim 1;
wherein the first communication module comprises at least one of a first connector or a wireless antenna, adapted to connect the removable device with the head unit.

9. The removable device according to claim 8, wherein the first connector comprises at least one of a USB connector or an HDMI connector, and wherein the wireless antenna comprises at least one of a Bluetooth antenna, a Wi-Fi antenna, or a multi-band antenna.

10. The removable device according to claim 1, wherein the mobile apps are executed using the API stored on the memory unit of the removable device; and wherein control signals are transmitted from the head unit to the removable device.

11. A method for providing at least one service to a head unit of a vehicle, comprising the following steps:
establishing a first connection between a removable device and the head unit for bi-directional communication of data via a first communication module of the removable device;
establishing a second connection between the removable device and a wireless network for bi-directional communication of data via a second communication module of the removable device, wherein the wireless network comprises a mobile telecommunication network;
bidirectionally communicating with the head unit via the first communication module to perform an authentication process between the head unit and the removable device storing at least one application on a memory unit of the removable device;
executing, on at least one processing unit of a control unit of the removable device, an application programming interface (API) implementing at least a first protocol for the communication with the head unit via the first communication module and at least one of a set of routines or a set of tools for execution of the at least one application on the at least one processing unit;
providing the at least one service to the head unit via the first communication module using the control unit; and
providing a runtime environment for mobile apps to the head unit;
wherein the at least one service is provided by executing the at least one application using the API, and
wherein the communication with the head unit is encrypted in an application layer.

12. The method according to claim 11, further comprising:
establishing a third connection between the removable device and a mobile communication device for bi-directional communication of data via a third communication module of the removable device;
wherein the at least one service is provided to the head unit via the first communication module based on data received via the third communication module.

13. The method according to claim 11, further comprising at least one of:
decoding data received from at least one of the wireless network or the head unit, by the removable device; or
encoding data to be transmitted to at least one of the head unit or the wireless network, by the removable device.

14. The method according to claim 11, further comprising providing a Human-Machine-Interaction (HMI) service to the head unit via the first communication module.

15. The method according to claim 11, further comprising:
decoding video data received from at least one of the wireless network or the head unit, by the removable device.

16. A dongle, adapted to connect to a head unit of a vehicle and comprising:
a first communication module configured for bi-directional communication of data with the head unit;
a second communication module configured for bi-directional communication of data with a wireless network, wherein the wireless network comprises a mobile telecommunication network;
a memory unit storing an application programming interface (API) implementing at least a first protocol for the communication with the head unit via the first communication module; and
a control unit comprising at least one processing unit adapted to execute the API;
wherein the control unit is configured to provide at least one service to the head unit via the first communication module;
wherein the control unit is further configured to provide a runtime environment for mobile apps to the head unit, wherein the mobile apps are executed using the API stored on the memory unit of the dongle; and wherein control signals for controlling the mobile apps are transmitted from the head unit to the dongle; and
wherein the control unit is further configured to bidirectionally communicate with the head unit via the first communication module to perform an authentication process with the head unit and to perform encryption of the communication with the head unit in an application layer.

\* \* \* \* \*